Feb. 18, 1941.                W. E. DUERINGER                2,232,219
                                CONTROL SYSTEM
                              Filed Aug. 4, 1937           3 Sheets-Sheet 2

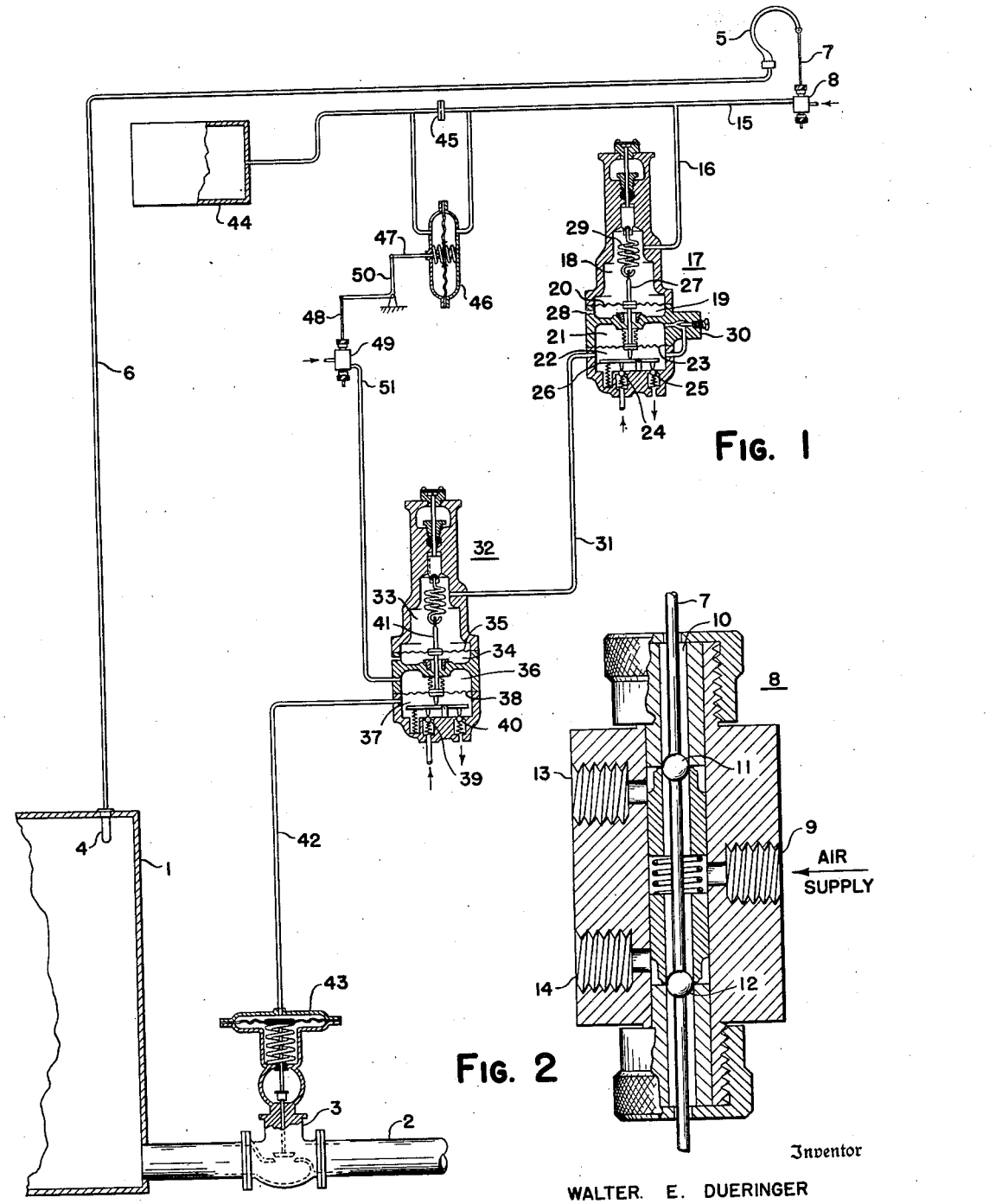

Inventor
WALTER  E.  DUERINGER
Raymond D. Junkins
                    Attorney

Patented Feb. 18, 1941

2,232,219

UNITED STATES PATENT OFFICE 2,232,219

CONTROL SYSTEM

Walter E. Dueringer, Shaker Heights, Ohio, assignor to Bailey Meter Company, a corporation of Delaware Application August 4, 1937, Serial No. 157,253

14 Claims. (Cl. 137—153)

This invention relates to control systems for maintaining a condition such as pressure, temperature, level, or electromotive force at or substantially at a desired value through regulating the rate of application of an agent producing, maintaining or otherwise affecting the condition.

In accordance with my invention the rate of application of the agent is varied in accordance with the second derivative of the magnitude of the condition with respect to time, or in other words in accordance with the rate of change of the rate of change of the magnitude of the condition. In order for control systems establishing a control effect varying in proportion to the magnitude of a condition with respect to time, or in accordance with the first derivative thereof to act, it is necessary that there be an appreciable change in the magnitude of the condition before the control effect will have changed sufficiently to produce a material effect on the rate of application of the agent. A consideration of the principles of my invention will indicate, however, that the control effect produced thereby changes most rapidly at the instant the condition is changing, and accordingly acts to correct the rate of application of the agent before a material change in the magnitude of the condition has occurred. In other words, changes in the magnitude of the condition are anticipated and proper correction in the rate of application of the agent made before such changes produce an appreciable departure in the magnitude of the condition from that desired. In order that the condition will be restored exactly to the desired magnitude after departure therefrom my invention further contemplates modifying the control of the agent in accordance with the second derivative of the magnitude of the condition by a control responsive to the first derivative of the magnitude of the condition, which may in turn be modified by a control in response to the magnitude of the condition with respect to time.

While I will describe my invention as applied to control systems wherein the control effect established by the condition responsive device is a variable fluid pressure, it will be obvious that its teachings are equally applicable to control systems producing a variable fluid volume, or electromotive force, for example.

In the drawings:

Fig. 1 is a diagrammatic illustration of an embodiment of my invention.

Fig. 2 is an elevation view in cross section of a preferred form of pilot valve.

Figure 6:
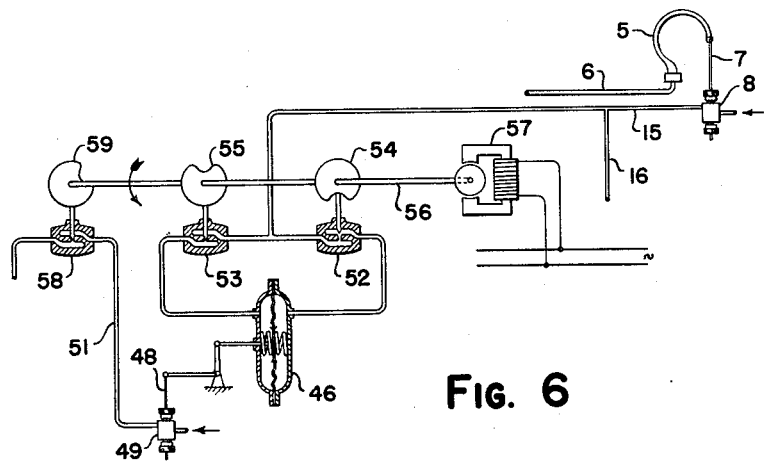
Fig. 6 illustrates a modification of a part of the apparatus shown in Fig. 1.

Referring to Fig. 1, I therein show an energy utilizing device, such as a tank 1, which is maintained at a predetermined or desired temperature by an agent, such as steam for example, supplied through a conduit 2, in which is located a regulating valve 3.

The temperature within the tank 1 is determined by means of a thermometric system comprising a bulb 4 connected to a Bourdon tube 5 by means of a capillary 6. The bulb 4, Bourdon tube 5, and capillary 6 are filled with an inert gas, liquid or vapor, so that the pressure therein varies in consonance with variations in temperature within the tank 1. As the temperature within the tank 1 increases, the free end of the Bourdon tube 5 is positioned in a counterclockwise direction, and as the temperature decreases, in a clockwise direction. Through the agency of devices hereinafter to be described the valve 3 is positioned by a fluid pressure established by the Bourdon tube 5, to vary the rate of flow of steam to maintain the temperature within the tank 1 at the desired value.

Positioned by the free end of the Bourdon tube 5 is the movable valve stem 7 of a pilot valve 8 illustrated as being of the type forming the subject matter of a United States patent to Clarence Johnson dated September 15, 1936, Serial No. 2,054,464. The pilot valve 8 is shown in cross section and to larger size in Fig. 2. A fluid under pressure, such as compressed air, is admitted to the pilot valve 8 through an inlet port 9, which is connected to a passageway 10 running longitudinally through the pilot valve and open at either end to the atmosphere. A flow of pressure fluid is maintained from the inlet port 9 through the passageway 10 and exhausted to the atmosphere.

The movable valve member 7 carries lands 11 and 12 which are of slightly less diameter than the passageway 10 so that a pressure gradient is established by the pressure fluid in flowing past them. Immediately adjacent the land 11 is an outlet port 13, and adjacent the land 12 a similar outlet port 14. The positions of the lands 11 and 12 relative to the outlet ports 13 and 14 determine the pressure established thereat. As the movable valve member 7 is moved upwardly the pressure at the outlet port 13 increases, whereas that at the outlet port 14 decreases. Conversely when the valve member 7 is moved downwardly the pressure established at the outlet port 13 decreases, whereas that established at the outlet port 14 increases.

In the embodiment of my invention disclosed in Fig. 1, I prefer to establish a fluid pressure varying directly with the magnitude of the temperature within the tank 1. Accordingly, I connect a pipe 15 to the outlet port 13 of the pilot 8. As the Bourdon tube 5 is positioned in a counterclockwise direction, proportional to increases of temperature within the tank 1, the pressure within the pipe 15 will likewise increase proportionately. In other words, for every temperature existing within the tank 1 there will be a predetermined definite pressure established within the pipe 15. Pressure fluid may be prevented from exhausting through the outlet port 14 by inserting therein a suitable plug or stopper.

Connected to the pipe 15 is a pipe 16 serving to transmit pressures established by the pilot valve 8 to a standardizing relay 17 shown as being of the type forming the subject matter of the United States patent to Harvard H. Gorrie, No. 2,098,914. The relay 17 comprises a pair of chambers 18 and 19 separated by a pressure sensitive diaphragm 20 and a second pair of chambers 21 and 22 separated by a pressure sensitive diaphragm 23. Fluid under pressure from any suitable source (not shown) is admitted to the chamber 22 through a normally closed inlet or supply valve 24 and exhausted therefrom through a normally closed exhaust or waste valve 25. Tilting of a fulcrumed beam 26 in one direction opens the valve 24, and tilting in the opposite direction opens the valve 25. The beam 26 is actuated by a movable member 27 operatively connecting diaphragms 20 and 23. Downward movement of the member 27 from the neutral position shown serves to open the valve 24, thereby admitting pressure fluid to the chamber 22. Conversely, upward movement of the member 27 serves to open the valve 25, exhausting pressure fluid from the chamber 22.

The effective force acting on the diaphragm 20 is proportional to the difference in pressures within chambers 18 and 19. As shown, the pressure established by the pilot 8 is admitted to chamber 18, whereas chamber 19 is open to the atmosphere through a port 28, so that the pressure therein remains substantially constant. The effective force acting upon the diaphragm 23 is proportional to the difference in pressures within chambers 21 and 22.

The relay 17 is adjusted by means of a spring 29 so that with equal pressures existing within chambers 21 and 22 and the pressure established by the pilot 8 at a value corresponding to the desired value of the temperature within the tank 1, valves 24 and 25 are closed. Upon an increase in temperature above the desired value the pressure within chamber 18 will increase proportionately, and inlet valve 24 will open until the pressure within chamber 22 has increased a proportionate amount, or until the force acting upwardly upon the diaphragm 23 again balances that acting downwardly on the diaphragm 20, when equilibrium will be restored.

Chambers 21 and 22 are shown in communication through an adjustable bleed valve 30. When the pressure within chamber 22 is increased to restore equilibrium, pressure fluid will slowly seep through the valve 30, increasing the pressure within chamber 21. As the pressure within chamber 21 increases the upwardly acting force on diaphragm 23 will decrease, causing valve 24 to again open and increase the pressure within chamber 22 still further. Such regenerative action will continue as long as the temperature within the tank 1 remains above the desired value, the fluid pressure within the chamber 22 gradually increasing at a rate dependent upon the extent of departure of the temperature from the desired value. As the temperature returns toward the desired value, the pressure within chamber 22 is decreased proportionately, and when the temperature is again at the desired value the pressure within the chamber 22 will be equal to that in chamber 21, although at a different magnitude than existed previous to the original departure of the temperature from the desired value.

Upon a decrease in temperature below the desired value the reverse action occurs. The fluid pressure within chamber 22 is first reduced an amount proportional to the decrease in temperature, and thereafter due to the differential thus established between chambers 21 and 22 continuously reduced at a rate proportional to the decrease in temperature until the desired value of temperature is again restored.

Pressures within the chamber 22 are transmitted through a pipe 31 to an averaging relay 32 in some respects similar to the standardizing relay 17. The relay 32 comprises a pair of chambers 33 and 34 separated by a pressure sensitive diaphragm 35; and a second pair of chambers 36 and 37 separated by a pressure sensitive diaphragm 38. Pressure fluid is admitted to the chamber 37 through a supply valve 39 and exhausted therefrom through a waste valve 40. The valves 39 and 40 are arranged to be actuated by a movable member 41 operatively connecting diaphragms 35 and 38.

The relay 32 acts to reproduce within chamber 37 changes in pressure occurring within chamber 22 of the standardizing relay 17. Thus for a given increase in pressure within the chamber 22 there will be a similar increase in pressure within chamber 37, and conversely for a given decrease in pressure within chamber 22 there will be a like decrease in pressure within chamber 37.

Pressures established within the chamber 37 are transmitted through a pipe 42 to a diaphragm servo-motor 43 positioning the valve 3. For every pressure existing within the diaphragm servo-motor 43 there is a definite position of the valve 3, and as shown, increases in pressure within the diaphragm motor progressively position the valve 3 in a closing direction, thereby decreasing the rate of flow of steam to the tank 1.

The operation of the control system so far described is as follows: Assume first a condition of equilibrium when the temperature within the tank 1 is at the desired value. Under this condition a predetermined definite pressure is established by the pilot 8 sufficient to counterbalance the force produced by the spring 29, the beam 26 is then in the neutral position and valves 24 and 25 are closed. The pressure within chamber 22 is equal to that within chamber 21 so there is no bleed of pressure fluid through valve 30. The pressure within chambers 21 and 22 is not necessarily equal to that within chamber 18 however, but maintains the valve 3 in a position establishing a rate of flow of heating fluid sufficient to supply the demand of tank 1.

Assume now that the temperature within tank 1 increases above the predetermined value at a constant rate until a given amount of departure obtains. The movable valve member 7 will be positioned upwardly in consonance with the temperature increase, and at a rate equal to the rate of increase in temperature. Accordingly the pressure established at the outlet port 13 will likewise increase at a rate proportional to the rate of temperature increase. This change in pressure at the outlet port 13 will be reproduced through relays 17 and 32 and be effective for positioning the valve 3 so that the rate of supply of heating fluid through the conduit 2 will be varied in accordance with the rate of change in temperature within the tank 1. Such action will occur substantially instantaneously with changes in temperature within the tank 1 and be completed before the effect of the bleeding action between chambers 21 and 22 becomes appreciable. However, if the temperature remains at the given amount of departure for a relatively long increment of time, the pressure within chamber 22 will gradually increase at a rate proportional to the amount of departure of the temperature within the tank 1 from the desired value. Such changes in pressure within chamber 22 will be reproduced within diaphragm motor 43 and will accordingly serve to vary the rate of flow of heating fluid through the conduit 2 in accordance with the amount of departure of the temperature from the desired value. That is, if the temperature is one unit away from the desired value, the valve 3 and the rate of flow of heating fluid will be varied at some predetermined rate, if the temperature is two units away from the desired value, then the position of the valve 3 and accordingly the rate of flow of heating fluid will be varied at a more rapid rate.

As the temperature is restored toward the desired value, due to the decrease in rate of application of the heating fluid, the pressure established by the pilot 8 will decrease proportionately, which decrease will serve to momentarily position the valve 3 in an opening direction. However, so long as the temperature remains above the desired value the bleeding action between chambers 21 and 22 will continuously serve to position the valve 3 in a closing direction. When the temperature within the tank is restored to the desired value, pressures within chambers 21 and 22 will again be equal, but will be different from those existing therein prior to the original change in temperature.

Upon a decrease in temperature below the desired value the reverse action occurs. The pressure within chamber 22 is first reduced an amount proportional to the decrease in temperature, and thereafter continuously reduced at a rate proportional to the amount of departure of the temperature from the desired value until the desired temperature is again restored.

For purposes of analysis the action of the relay 17 is preferably divided into two parts. The first action is to reproduce in chamber 22 changes in pressure within chamber 18. The second action is to continuously vary the pressure within chamber 22 at a rate proportional to the amount of departure of the temperature from the desired value and in a direction dependent upon the sense of departure of the temperature from the desired value. The first action gives in chamber 22 a control effect varying in accordance with the first derivative of the magnitude of the temperature with respect to time, or a control effect varying in accordance with the rate of change in the temperature. The second action gives a control effect varying with the magnitude of the temperature, or varying with the amount of departure of the temperature from the desired value.

To establish a pressure effective for varying the rate of flow of heating fluid through the conduit 2 in accordance with the second derivative of the magnitude of the temperature within the tank 1 with respect to time, I show connected to the pipe 15 a chamber 44. The pressure within chamber 44 will be substantially equal at any instant to that established at the outlet port 13 of the pilot 8. As in the embodiment of my invention shown in Fig. 1, I have suggested utilizing a compressible pressure fluid, such as compressed air, upon a change in pressure established by the pilot 8 there will be a flow of fluid through the pipe 15 from or to the chamber 18. That is, upon an increase in pressure established by the pilot 8 a flow of pressure fluid to the chamber 18 will occur until the pressure therein is equal to that established by the pilot 18. Conversely, upon a decrease in pressure established by the pilot 8 a flow of pressure fluid will occur from the chamber 18 to the pilot 8. If the temperature within the tank 1 changes at a constant rate, then the pressure established by the pilot 8 will likewise change at a constant rate and a flow of pressure fluid at a constant rate will occur within the pipe 15 throughout the duration of such change. If the rate of temperature change increases, then the flow of pressure fluid through the pipe 15 will likewise increase. There is, therefore, a relation between the rate of flow of pressure fluid through the pipe 15 and the rate of temperature change within the tank 1.

Located in the pipe 15 is an obstruction shown as an orifice 45 for producing a differential varying in functional relation to the rate of flow of pressure fluid through the pipe 15. The differential produced by the orifice 45 is measured by a pressure responsive device 46 having a drive member 47 positioned from a neutral position (that condition existing when no flow exists in the line 15) in accordance with the differential established by the orifice 45, or inferentially in accordance with the rate of flow of fluid through the pipe 15. When the flow of fluid through the pipe 15 is from the chamber 44 to the pilot 8, then the member 47 is positioned to the right, as shown in the drawings, and when the flow is from the pilot 8 to the chamber 44 the member 47 is positioned to the left.

The arm 47 is arranged to position the movable valve member 48 of a pilot 49 (similar to the pilot 8) through a bell crank 50. When the member 47 is positioned to the left the valve member 48 is moved downwardly, thereby increasing the pressure established within a pipe 51 connected to the lower outlet port of the pilot 49. When the arm 47 is moved to the right, thereby moving the valve member 48 upwardly, the pressure within the pipe 51 is reduced proportionately.

The pipe 51 is connected to the chamber 36 of the relay 32. Accordingly changes in the pressure established by the pilot 49 produce proportionate changes in the pressure within the servo-motor 43 and serve to position the valve 3. Inasmuch as the differential produced by the orifice 45 remains constant so long as the flow of pressure fluid through the pipe 15 remains constant, the pressure established by the pilot 49 varies only when there is a change in the rate of flow of fluid through the pipe 15, which in turn occurs only when there is a change in the rate of change of the temperature within the tank 1. The pilot 49 therefore establishes a pressure varying in accordance with the second derivative of the magnitude of the temperature within the tank 1 with respect to time, or in other words a pressure varying in accordance with the rate of change of the rate of change of the magnitude of the temperature.

Figure 4:
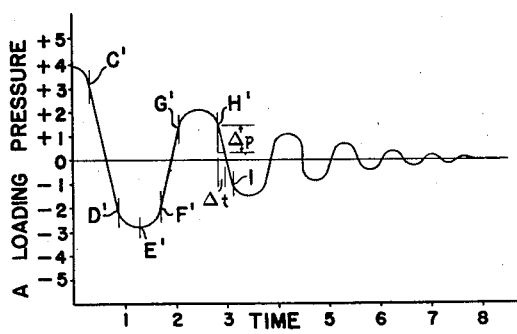
Figs. 3, 4 and 5 are graphs illustrating the principles of operation of a control system embodying my invention.
Figure 3:
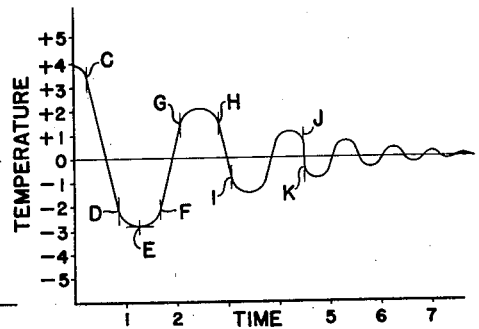
Figure 5:
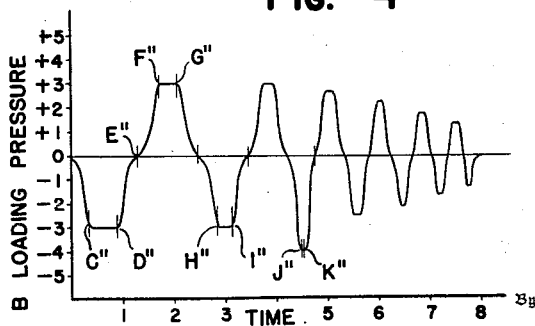

A comprehension of the principles of my invention may be furthered by reference to Figs. 3, 4 and 5, delineating graphically the operation of the control under an assumed temperature disturbance. In Fig. 3 is plotted temperature deviations from the normal or desired value with respect to time. The curve has the general characteristics of a damped harmonic function having an initial amplitude of +4 and attenuating to zero amplitude after six complete oscillations. Fig. 4 is a graph of the pressure established by the standardizing relay 17, neglecting the regenerative action produced by the bleed valve 30 and chamber 21, under the temperature disturbance shown in Fig. 3. The time of each temperature oscillation shown in Fig. 3 is assumed to be so short that the effect of the regenerative or secondary action of the relay 17 on the loading pressure produced thereby is negligible. For convenience I have termed the loading pressure produced by the relay 17 and shown in Fig. 4 as the "A" loading pressure.

Inasmuch as the valve 3 moves in consonance with changes in A loading pressure, the graph in Fig. 4 may further be considered as illustrating the changes in rate of flow of heating fluid produced by the control responsive to the first derivative of the magnitude of the temperature with respect to time. Fig. 5 is a graph of the loading pressure, which I have termed "B" loading pressure, established by the control responsive to the second derivative of the magnitude of the temperature with respect to time, and may further be considered as a graphical illustration of the changes in flow of heating fluid occasioned by the control under the temperature disturbance shown in Fig. 3. The scale of loading pressures in Figs. 4 and 5 are not in absolute units but are relative to the pressure existing when the controls are in neutral position. That is, zero A loading pressure is that magnitude of pressure established by the pilot 8 and accordingly by the relay 17 when the temperature is at the desired value. Correspondingly, zero B loading pressure is that pressure established by the pilot 49 when no flow exists through pipe 15, which condition obtains when the temperature within the tank 1 is constant. The time units or graduations shown are likewise considered merely arbitrary and not representative of absolute units, that is each successive graduation represents the passage of a definite interval of time, but the absolute length of the interval is indeterminate.

The initial temperature deviation of approximately +4 may have been caused, for example, by a sudden decrease in heat demand of the tank 1. The following oscillations in temperature extending through seven time intervals are caused by the control in restoring the temperature to the desired value. That is, caused by the control in again making the heat supply equal to the heat demand. It is to be understood, of course, that the curve has been drawn arbitrarily merely to illustrate the operation of the control in an assumed case, which may or may not be typical of the operation of the control when applied to any specific actual application. In general, in any specific actual application the several oscillations of the temperature shown will not occur, but the control will act to immediately restore the temperature to the desired value after departure therefrom without overtravel or hunting.

At the initial temperature condition shown in Fig. 3, a departure of approximately +4 existed at zero time. At this instant a proportional A pressure would exist which would establish a given rate of flow of steam through the conduit 2. At this initial instant the temperature curve is horizontal or constant in magnitude, so that there would be zero B pressure established. From the initial point to a point C the temperature was decreasing at a variable rate, which would occasion a proportionate decrease in A loading pressure to point C'. The position of the valve 3 therefore, and accordingly the rate of flow of heating fluid would be changed in accordance with the rate of change in temperature or in accordance with the first derivative of the temperature with respect to time.

During the increment of time to point C the B pressure would vary at a rate proportional to the instantaneous slope of the curve of A loading pressures to a final point C''. As the rate of change of the A loading pressure to point C' is great, a relatively large decrease in B pressure would occur. Thus while the A pressure was varying from +4 to +3.3 the B loading pressure would decrease from zero to −3. At the instant of change in the rate of change of temperature, therefore, the rate of flow of heating fluid would be changed a relatively large amount in a direction to prevent the change. In effect the control establishing the B pressure anticipates the amount of change in temperature which will be effected by the rate of change in temperature.

From the point C to a point D the temperature was decreasing at a constant rate. The A loading pressure would decrease proportionately and serve to position the valve 3 in an opening direction at a proportionate rate. Inasmuch as the rate of temperature decrease from point C to point D is constant, the B pressure would remain constant from point C'' to point D''.

From point D to E the temperature was changing at a variable rate, which would effect a corresponding change in A pressure from D' to E'. As the rate of change in temperature is decreased between points D and E the B pressure would increase from point D'' to E''. As at point E the temperature curve is horizontal, indicating a zero rate of change, the point E'' lies on the zero value of B pressure.

From point E to F the rate of change in temperature is rapidly increasing, which would occasion an increase in A pressure from F' to G' and an increase in B pressure from E'' to F''. The slope of the temperature curve from point F to point G is equal to the slope from point C to D, but in reverse direction. Accordingly, points F'' and G'' will lie the same distance from the zero line as do points C'', D''. Likewise as the slope of the temperature curve from point H to point I is the same as that from point C to point D the B pressure will have the same value from point H'' to I'' as from point C'' to point D''.

To further illustrate the operation of the control which is responsive to the second derivative of the temperature with respect to time, I show the temperature curve from a point J to a point K as having a steeper slope than from point C to D, but where the actual deviation in temperature is considerably smaller. The section J—K of the temperature curve corresponds to section J″—K″ of the B pressure curve. It is to be noted that this section is considerably below the section C″—D″ and that therefore during this period the valve 3 would be positioned considerably further in an opening direction, although the magnitude of the temperature deviation is considerably smaller. In other words, the position of the valve 3 produced by a control responsive to the second derivative is entirely independent of the magnitude of the temperature, but depends solely upon the rate at which the temperature is changing.

In Fig. 6 I show a modified form of apparatus for establishing a loading pressure proportional to the rate of change in temperature, or a control occasioning a variation in the rate of application of the correction agent in accordance with the second derivative of the magnitude of the temperature with respect to time. In the instant embodiment I determine the variation in A pressure established by the pilot 8 during successive increments of time and cause the pilot 49 to be positioned to establish a B pressure proportional to the variations. Thus referring to Fig. 4, the apparatus acts to determine the variation in A pressure through alternate increments of time shown as Δt, and then to establish a B pressure proportional to the magnitude of Δp, during successive increments of time. It is apparent that Δp is proportional to the slope of the A pressure at the mid point of Δt, and that therefore the B pressure established in accordance therewith will be proportional to the derivative of the curve of A pressure.

Referring to Fig. 6, loading pressures established by the pilot 8 are transmitted through pipe 15 to valves 52 and 53. The valve 52 is connected to a chamber of the pressure responsive device 46 and the valve 53 is connected to the opposed chamber. Valves 52 and 53 are arranged to be periodically actuated by cams 54 and 55 respectively mounted on a cam shaft 56 rotated in the direction of the arrow at a more or less constant speed by a suitable driving device shown as a motor 57.

The operation of the apparatus is as follows: The valve 52 is first momentarily opened, introducing into the pressure responsive device 46 the pressure established at that instant by the pilot 8. The valve 52 then closes. At the termination of the increment of time Δt, the valve 53 is momentarily opened and the pressure established by the pilot 8 at that instant introduced into the pressure responsive device 46. Valves 52 and 53 then remain closed for an increment of time when the operation is again repeated. During this increment of time when both valves 52 and 53 are closed the difference in pressure within the opposed chambers of the pressure responsive device 46 will be equal to the difference in pressure established by the pilot 8 at the beginning of the time interval Δt and at the termination thereof. Accordingly, during this increment of time the loading pressure established by the pilot 49 will be proportional to the Δp occurring during the increment of time Δt. The loading pressure established by the pilot 49 is transmitted by pipe 51 to a valve 58 and thence to the chamber 36 of the averaging relay 32. The valve 58 is arranged to be actuated by a cam 59 mounted on the cam shaft 56. The valve 58 is closed except for an instant shortly after the valve 53 has closed. That is, immediately after the increment of time Δt the valve 58 operates to introduce into chamber 36 a loading pressure proportional to the change in pressure Δp. The pressure introduced into the chamber 36 remains constant (due to the fact that valve 58 is closed) until the next cycle of operation of valves 52 and 53 is completed, when it is again momentarily introduced and the pressure within chamber 36 varied to correspond to the change in pressure established by the pilot 8 during the succeeding interval of time Δt.

In some applications of my invention to particular types of apparatus I find it advisable to have the loading pressure established by the pilot 49 in the embodiment shown in Fig. 6 periodically returned to some predetermined value. For example, it may be returned to the value corresponding to the neutral position of the pressure sensitive device 46 shown as zero B loading pressure in Fig. 5. Such operation will serve to periodically transmit to the servo-motor 43 during alternate increments of time a change in loading pressure proportional to the rate of change of the rate of change of the temperature. Thus, during alternate increments of time the valve 3 will be positioned so that the rate of flow of heating fluid is momentarily varied in accordance with the second derivative of the magnitude of the temperature with respect to time. Such periodic positioning of the valve 3 serves to prevent sticking of the valve parts which may occur if the valve 3 remains in stationary position over a considerable period of time. I have further found that such operation gives improved regulation in applications where the demand for energy varies but slightly.

Figure 7:
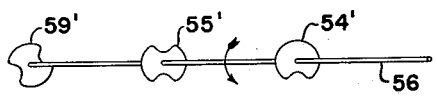
Fig. 7 illustrates a modified form of a cam shaft which may be used with the embodiment of my invention as shown in Fig. 6.

In Fig. 7 I show mounted on the cam shaft 56 modified cams 55' and 59' which in this modification are used in place of cams 55 and 59 to periodically reduce or change the pressure established by the pilot 49 to some predetermined magnitude. When cams 55' and 59' are used the valve 53 is opened simultaneously with valve 52. When valves 52 and 53 are simultaneously opened, equal pressures will exist within the opposed chambers 46, so that the pilot 49 will be positioned to establish in the pipe 51 some predetermined pressure. Shortly after closure of valves 52 and 53 valve 58 is opened, so that the pressure established within the pipe 51 is transmitted to the chamber 36 of relay 32. This pressure will exist in chamber 36 for a predetermined increment of time, and once during each revolution of the cam shaft 56 the pressure within chamber 36 will be returned to the particular value established by the pilot 49, when the pressure responsive device 46 is in the neutral position.

After the predetermined increment of time Δt the valve 53 will again open and introduce into the pressure responsive device 46 the loading pressure then established by the pilot 8. The pilot 49 will then establish within the pipe 51 a loading pressure proportional to the difference in pressures established by the pilot 8 at the beginning of the increment of time Δt and at the termination thereof. Shortly after the valve 53 is opened, valve 58 is again opened, so that the pressure established by the pilot 49 is introduced into chamber 36. This pressure will be effective within chamber 36 throughout the remainder of the cycle of operation, when after simultaneous opening of valves 52 and 53, restoring the pressure established by the pilot 49 to the predetermined value, valve 58 will again be opened bringing the pressure within chamber 36 to the predetermined value.

Figure 8:
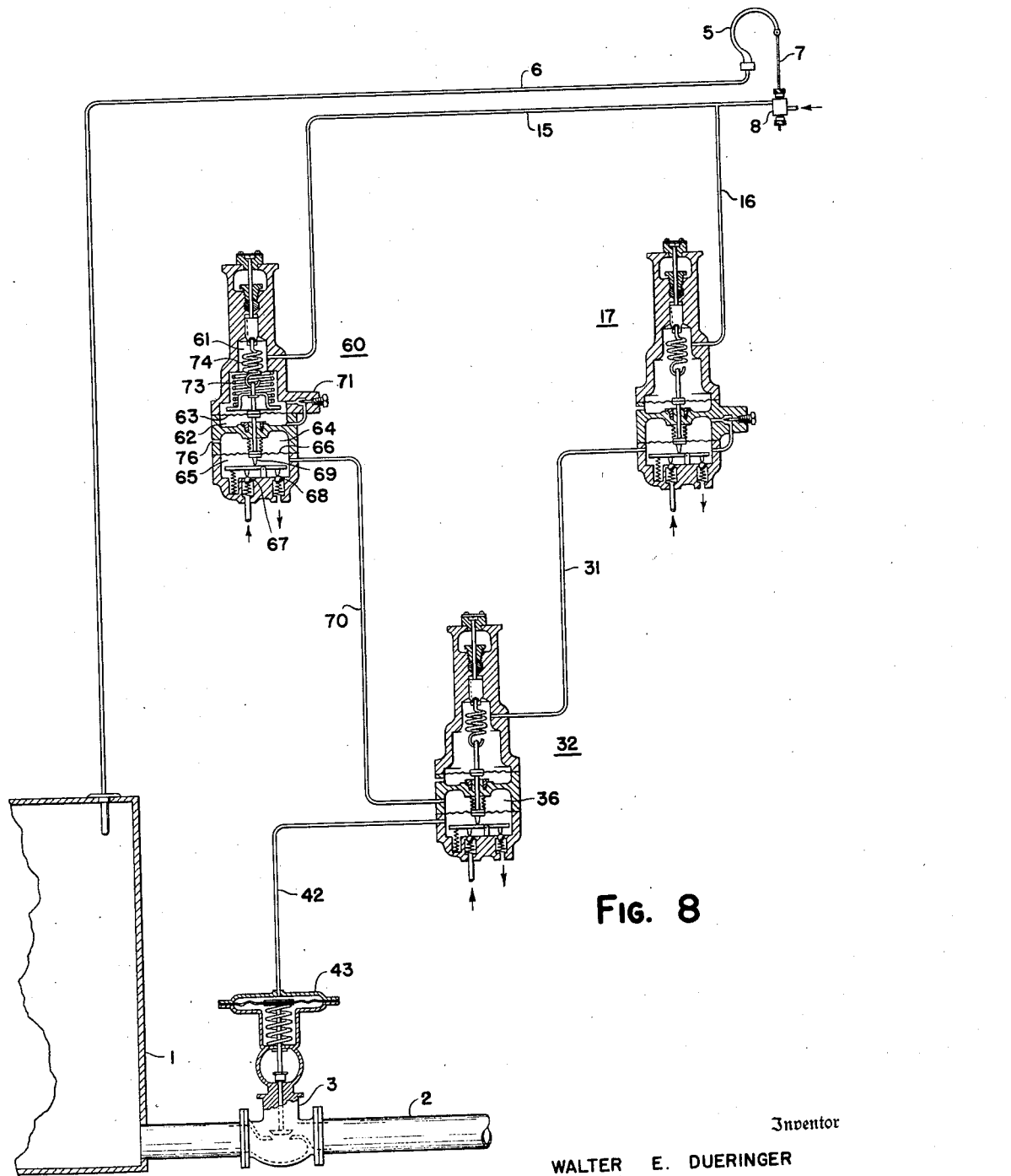
Fig. 8 illustrates a further modified form of my invention in diagrammatic form.

In Fig. 8 I show a further modified form of my invention wherein I establish within the chamber 36 of the relay 32 a fluid pressure varying in accordance with the rate of change of the rate of change of the temperature within the tank 1 by means of a relay 60.

The relay 60 in its physical aspects is similar to the relay 32 and comprises a pair of chambers 61 and 62 separated by a pressure sensitive diaphragm 63; and a second pair of chambers 64 and 65 separated by a pressure sensitive diaphragm 66. Pressure fluid is admitted to the chamber 65 through a supply valve 67 and exhausted therefrom through a waste valve 68. The valves 67 and 68 are operated by a movable member 69 operatively connecting diaphragms 63 and 66. Pressures within the chamber 65 are transmitted to the chamber 36 of the relay 32 through a pipe 70. Chambers 61 and 62 are in communication through an adjustable bleed valve 71. Chamber 64 is open to the atmosphere through a port 76. Pressures established by the pilot valve 8 are transmitted to chamber 61 through the pipe 15.

The relay 60 is initially adjusted by means of a compression spring 73 and a tension spring 74, so that with equal pressures existing within chambers 61 and 62 a zero B loading pressure as shown in Fig. 5 is established within chamber 65 and accordingly within chamber 36 of relay 32. This condition will exist, that is the condition of equal pressures within chambers 61 and 62, whenever the pressure established by the pilot 8 is constant. When the pressure established by the pilot 8 is increasing, the pressure within chamber 61 will be greater than within chamber 62 by an amount proportional to the rate at which the pressure is increasing. For a given rate of change of the pressure established by the pilot 8 the difference in pressure within chambers 61 and 62 is determined by the adjustment of the bleed valve 71. As the bleed valve 71 is positioned in an opening direction the more nearly will the pressure within chamber 62 approach that within chamber 61, and conversely as the bleed valve 71 is positioned in a closing direction the greater the difference in pressures between chambers 61 and 62 will be. When the pressure established by the pilot 8 is decreasing, then the pressure within the chamber 62 will be greater than that in the chamber 61 by an amount proportional to the rate at which the pressure established by the pilot 8 is decreasing.

It is apparent, therefore, that for each rate of change of the pressure established by the pilot 8 there will be a definite difference in pressures within chambers 61 and 62 and that difference will be proportional to the second derivative of the magnitude of the temperature within the tank 1 with respect to time; and for each difference in pressure within chambers 61 and 62 there will be a definite pressure established within chamber 65. It is apparent, therefore, that the control system disclosed in Fig. 8 operates in accordance with the principles of the system disclosed in Fig. 1 wherein I establish a differential pressure bearing a functional relation to the second derivative of the magnitude of the temperature within the tank 1 with respect to time by means of an orifice 45.

In the embodiment of my invention shown in Fig. 8 differences in pressures within chambers 61 and 62 act to position the member 69 from a neutral position when valves 67 and 68 are closed. When the pressure within chamber 61 increases above that within chamber 62 the member 69 moves downwardly, opening the supply valve 67 until the pressure within chamber 65 has increased an amount proportional to the difference in pressure existing within chambers 61 and 62, when the member 69 will be returned to the neutral position. Conversely, when the pressure within chamber 62 is above that within chamber 61, then the member 69 is positioned upwardly, opening exhaust valve 68 until the pressure within chamber 65 has decreased an amount proportional to the difference in pressures within chambers 61 and 62, when the member 69 is restored to the neutral position. It is apparent that changes in pressure within chamber 65 will occur coincident with and in the same direction as changes in the difference in pressures existing within chambers 61 and 62. Pressures within chamber 65 may, therefore, be said to vary as the second derivative of the magnitude of the temperature within the tank 1 with respect to time, and will therefore act through the relay 32 and servo-motor 44 to vary the rate of flow of heating fluid accordingly.

While I have illustrated and described certain embodiments of my invention, it will be apparent that various changes and modifications may be made without departing from the invention. The appended claims should therefore be referred to in determining the true spirit and scope of the invention.

What I claim as new, and desire to secure by Letters Patent of the United States, is:

1. In a control system, in combination, a pipe having one end connected to a chamber, means for producing changes in the pressure at the opposite end of said pipe in accordance with changes in the magnitude of a condition, an obstruction in said pipe for producing a differential pressure varying in sense and amount in accordance with the direction and amount of fluid flow in said pipe, measuring means of said differential, means actuated by said last named means for producing changes in a fluid pressure in accordance with changes in the differential, and regulating means of an agent affecting the condition under the control of said last named means.

2. In a control system, in combination, means for establishing a first fluid pressure in accordance with the magnitude of a condition, means for determining the changes in said fluid pressure during successive increments of time, means actuated by said last named means for establishing a second fluid pressure in accordance with the change in magnitude of the first fluid pressure, and regulating means of an agent effecting the condition under the control of said second fluid pressure.

3. In a control system, in combination, means for establishing a first fluid pressure in accordance with changes in the magnitude of a condition, means for establishing changes in a second fluid pressure in accordance with changes in the first fluid pressure during successive increments of time, and regulating means of an agent effecting the condition under the control of the second fluid pressure.

4. In a control system, in combination, means for producing changes in a first pressure in accordance with changes in the magnitude of a condition, means for producing a second pressure having a predetermined normal value, means for periodically for predetermined increments of time varying said second fluid pressure in accordance with changes in said first fluid pressure, and regulating means of an agent effecting the condition under the control of the second fluid pressure.

5. In a control system, in combination, means for producing a pressure normally having a predetermined value, means for periodically producing fluctuations in said pressure in accordance with changes in the magnitude of a condition, and regulating means of an agent effecting the condition under the control of the fluid pressure.

6. In a control system, in combination, means for producing a pressure normally having a predetermined value, means for periodically producing fluctuations in said fluid pressure having a magnitude proportional to changes in the magnitude of a condition for increments of constant time length, and regulating means of an agent affecting the condition under the control of said pressure.

7. In a control system, in combination, means for producing changes in a first fluid pressure in consonance with changes in the magnitude of a condition, means for producing a differential pressure in accordance with the rate of change in said first fluid pressure, means for producing a second fluid pressure in accordance with said differential pressure and regulating means of an agent producing or maintaining said condition under the control of said second fluid pressure.

8. In a control system, in combination, means for producing changes in a first fluid pressure at a rate proportional to the rate of change in the magnitude of a condition, means for producing a differential pressure proportional to the rate of change of said first fluid pressure, means for establishing a second fluid pressure proportional to the magnitude of said differential pressure, and regulating means of an agent producing or maintaining said condition under the control of said second fluid pressure.

9. In a control system, in combination, means for producing changes in a first fluid pressure at a rate proportional to the rate of change in the magnitude of a condition, a differential relay having opposed chambers, means for introducing said fluid pressure into one of said chambers, a restricted connection between said chambers, a member moved from a neutral position in accordance with the unbalance of pressures in said chambers, means actuated by said member for producing a fluid pressure in accordance with the unbalance of said pressures acting to restore said member to the neutral position, and regulating means of an agent producing or maintaining said condition under the control of said second fluid pressure.

10. In a control system, in combination, a pilot valve for establishing a first fluid pressure corresponding in magnitude to the magnitude of a condition and changing in magnitude in consonance with changes in the magnitude of the condition, a relay comprising a pair of cooperating pressure sensitive chambers, means for introducing said first fluid pressure into one of said chambers, a restricted connection between said chambers, means for producing changes in a second fluid pressure corresponding to the algebraic sum of the pressures in said chamber, and regulating means of an agent affecting the condition under the control of said second fluid pressure.

11. In a control system, in combination, a pilot valve for establishing a first fluid pressure corresponding in magnitude to the magnitude of a condition and changing in magnitude in consonance with changes in the magnitude of the condition, a relay comprising a pair of opposed pressure sensitive chambers, means for introducing said first fluid pressure into one of said chambers, a restricted connection between said chambers, means for producing changes in a second fluid pressure corresponding to the difference of the pressures in said chambers; and regulating means of an agent under the control of said second fluid pressure.

12. In a control system, in combination, a pilot valve for establishing a first fluid pressure corresponding in magnitude to the magnitude of a condition and changing in magnitude in consonance with changes in the magnitude of the condition, a relay comprising; a pair of opposed pressure sensitive chambers, means for introducing said first fluid pressure into both said chambers, means for retarding the admission and discharge of said fluid pressure to and from one of said chambers, and means for establishing a second fluid pressure in accordance with the difference of the pressures in said chambers; regulating means of an agent producing or maintaining said condition, and means for actuating said regulating means under the control of said second fluid pressure.

13. In a control system for regulating the rate of application of an agent to maintain a condition at a desired value, in combination, regulating means for the agent, a fluid pressure operated servo-motor for actuating said regulating means, and means for controlling the fluid pressure operating said servo-motor comprising, a first relay mechanism for producing changes in said fluid pressure proportional to changes in the magnitude of the condition and continuously varying the fluid pressure at a rate proportional to the departure of the condition from a desired magnitude; and a second relay mechanism for producing changes in said fluid pressure proportional to the rate at which the condition is changing in magnitude.

14. In a control system for regulating the rate of application of an agent to maintain a condition at a desired value, in combination, regulating means for the agent, a fluid pressure operated servo-motor for actuating said regulating means, and means for controlling the fluid pressure operating said servo-motor. comprising, a pilot valve for establishing a first fluid pressure corresponding to the magnitude of said condition and varying in consonance with changes in the magnitude of the condition, a first relay mechanism responsive to said first fluid pressure for producing changes in a fluid pressure operating said servo-motor proportional to changes in the magnitude of said condition, and a second relay mechanism for producing changes in the fluid pressure operating said servo-motor comprising, a pair of opposed pressure sensitive chambers, means for introducing said first fluid pressure into both said chambers, means for retarding the admission and discharge of said fluid pressure into and out of one of said chambers, and means for producing changes in the fluid pressure operating said servo-motor in accordance with changes in the difference in the pressures within said chambers.

WALTER E. DUERINGER.